United States Patent Office 2,972,645
Patented Feb. 21, 1961

2,972,645

CONJUGATED DIENES FROM TERTIARY ETHERS

Joseph A. Verdol, Dolton, and Russell W. Walker, Lansing, Ill., assignors to Sinclair Refining Company, New York, N.Y., a corporation of Maine No Drawing. Filed May 20, 1959, Ser. No. 814,380

7 Claims. (Cl. 260—681)

This invention is a catalytic dehydrogenation process for making conjugated diene hydrocarbons from tertiary ethers. Conjugated dienes are important intermediates in the preparation of many valuable materials; for example, isoprene is currently of interest as a starting material for the manufacture of "Synthetic Natural" rubber and butyl rubber. The preparation of diene hydrocarbons by this process has definite advantages over previous processes. The starting tertiary ethers, such as tertiaryamylmethyl ether, tertiaryhexylmethyl ethers, etc., can be prepared in high purity from petroleum refinery mixed streams, using the method of copending Verdol application Serial No. 810,591, filed May 4, 1959.

When tertiary ethers from the aforementioned process are employed in the process described herein, it is possible to prepare diene hydrocarbons of high purity, since the purity of the diene in this process is dependent upon the purity of the tertiary ether. The criterion of purity is very important in the preparation of "Synthetic Natural" rubber, since the polymerization process involves the use of alkali metal and organo metallic catalysts which are deactivated by certain impurities. The present process therefore provides a method of preparing isoprene and other conjugated dienes of the purity necessary for current and future commercial uses.

Prior art methods of making conjugated dienes frequently do not produce a pure product. For example, in the catalytic dehydrogenation of paraffins, like isopentane, impurities arise from accessory products formed during the dehydrogenation reaction. The preparation of high purity isoprene from isoamylenes by dehydrogenation is also limited when the isoamylenes are extracted from refinery streams by the sulfuric acid process, since the entrained impurities in the isoamylenes cause contamination of the isoprene.

Where non-hydrocarbons have been used prior to this invention in diene synthesis, the starting materials usually are difunctional compounds such as ether alcohols (U.S. Patent 2,229,652), vinyl ethers (U.S. Patent 2,502,430) and esters, e.g. vinyl acetates, and diesters. These difunctional compounds are of necessity much more expensive than the tertiary monoethers used in the process of this invention.

The compounds used as starting materials in the process are ethers, alkoxy alkanes, of 6 to 24 or more, preferably 6 to 12 carbon atoms in which the alkoxy or ether oxygen is attached to a branched chain alkyl, including cycloalkyl radical at a tertiary carbon, that is, a carbon which is attached to three other carbon atoms. The tertiary carbon must be in an aliphatic chain of at least 4 carbon atoms, and therefore the alkyl will have at least 5 carbon atoms to about 12 or more carbon atoms. The carbon atoms in the radical may be substituted with non-reactive substituents such as halogen, aryl, alkaryl, etc., and may be in ring, i.e. aromatic or cycloaliphatic structures. The alkoxy group may be methoxy or other —OR group containing up to about 12 or more carbon atoms and may be alkyl including cycloalkyl or aromatic, primary or secondary, i.e. non-tertiary, and substituted or non-substituted. The preferred starting materials have the formula:

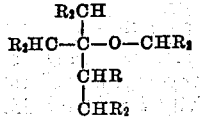

where R is hydrogen or lower alkyl, say of 1 to 8 carbon atoms. Advantageously no R contains more than 4 carbon atoms and the total number of carbon atoms are as noted before. The alkoxy group is preferably methoxy or ethoxy, while the alkane is preferably derived from a $C_5$ to $C_7$ isoolefin found in a petroleum refinery product.

Examples of some tertiary ethers which are used in this process are as follows:

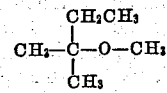

Tertiaryamylmethyl ether

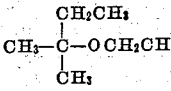

Tertiaryamylethyl ether

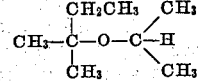

Tertiaryamylisopropyl ether

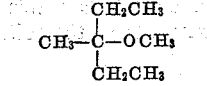

3-methyl-3-methoxypentane

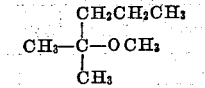

2-methyl-2-methoxypentane

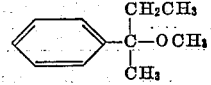

2-phenyl-2-methoxybutane

In accordance with this invention tertiary ethers of the defined structure are dehydrogenated in the presence of steam or other inert gas to afford a conjugated diolefin from the tertiary structure and an alcohol from the non-tertiary structures of the ethers. Some unreacted tertiary ether and monoolefin may also be present in the reactor effluent. The monoolefins can be separated from the effluent and recycled with recovered and/or fresh tertiary ether to produce further quantities of the desired conjugated hydrocarbon. Other usable inert gases are nitrogen, $CO_2$, CO, etc.

For example, tertiaryamylmethyl ether undergoes dehydrogenation in the presence of commercial dehydrogenation catalysts to afford a mixture of isoprene, isoamylenes, methanol and unreacted tertiaryamylmethyl ether:

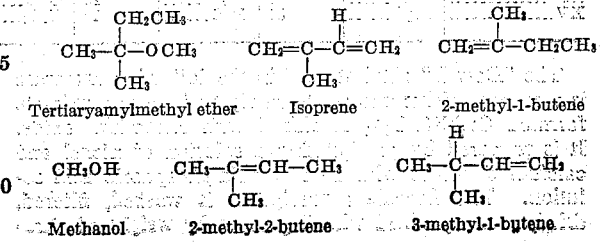

The methanol is easily recovered from the reactor effluent aqueous layer by distillation. The isoprene can be separated from the non-aqueous effluent and the remaining mixture of isoamylenes and unconverted tertiaryamylmethyl ether can be recycled (with additional fresh tertiaryamylmethyl ether if desired) to produce further quantities of isoprene.

A wide variety of catalysts is useful in carrying out the process of this invention. Many of these are commercially available "dehydrogenation" catalysts which usually derive their activity from the oxides of metals having an atomic number from 24 to 29, inclusive, that is, iron oxide, copper oxide, chromium oxide, manganese oxide, cobalt oxide, nickel oxide, singly or in combination, or materials giving these oxides upon calcination, supported or not supported on carriers. A specific usable catalyst is composed of 72.4 weight percent MgO, 18.4 weight percent $Fe_2O_3$, 4.6 weight percent CuO and 4.6 weight percent $K_2O$ and can be prepared by adding a solution of iron and copper sulfate to magnesium oxide suspended in water, filtering the reacted mixture, washing the slurry with a solution of potassium carbonate, drying and calcining at 1200° F. Where unsupported iron oxide is employed as a catalyst, the catalyst will consist predominantly (from about 50 to 99.5 percent by weight) of iron oxide promoted with a minor amount (generally from about 0.5 to 20 percent by weight) of an alkali metal oxide such as potassium oxide, sodium oxide, rubidium oxide, cesium oxide, or materials giving such oxides upon heating, as by calcination at about 750 to 1200° F. or more, for example, the carbonates or nitrates. Aluminum oxide, copper oxide, phosphorus oxides and zinc oxide, generally in the amount of from about 2 to 20 percent by weight, can be included in such catalysts as a stabilizer. Suitable catalysts of this type are composed of the following amounts of the following materials by weight.

mium oxide and pelleted. Catalysts of this type can be prepared as described in United States Patent No. 2,542,813. They can be regenerated with a mixture of steam and air in accordance with procedures which are well-known in the art.

The "Shell 205" catalyst is composed of a predominant amount of iron oxide and minor proportions of potassium oxide or carbonate and chromium oxide. Analysis of the virgin catalyst was 44.2 percent iron, 20.1 percent potassium, 1.52 percent chromium and 11.64 percent volatile material. "Shell 105" catalyst, a similar type, can also be employed. Catalysts of this type can be made by mixing finely powdered calcined ferric oxide, chromic oxide and potassium carbonate, wetting, forming into pellets and calcining at 800° C. to 950° C.

Various other catalysts which have dehydrogenating activity can be employed in the process but care must be taken when steam is used as the inert gas, to choose a steam-insensitive catalyst. Thus, catalysts prepared by impregnating bauxite with about 5 percent by weight of barium hydroxide and/or strontium hydroxide may be used, in the presence of steam, potassium hydroxide being employed as a promoter if so desired.

The conversion of the tertiary ether to the conjugated diene is accomplished by contacting the ether in the gaseous or vapor phase with the catalyst. This contacting serves to break the ether linkage without dehydrogenation in some molecules, leaving a tertiary olefin which may be recycled. Generally, the reaction temperature employed will be within the range from about 1000° F. to 1250° F., while a range of about 1100 to 1200° F. is preferred. Generally, the reaction pressure employed will be approximately atmospheric pressure. However, the reaction can also be carried out at sub- or superatmospheric pressures if desired.

The reaction may be performed batchwise but prefer-

TABLE I

| Catalyst | Component | Percent | Component | Percent | Component | Percent | Component | Percent |
|---|---|---|---|---|---|---|---|---|
| I | $Fe_2O_3$ | 98 | $K_2O$ | 2 | | | | |
| II | $Fe_2O_3$ | 93 | $K_2O$ | 2 | CuO | 5 | | |
| III | $Fe_2O_3$ | 91 | $K_2O$ | 2 | CuO | 5 | $Al_2O_3$ | 2 |
| IV | $Fe_2O_3$ | 78.5 | $K_2O$ | 1.5 | CuO | 5 | $Al_2O_3$ | 15 |
| V | $Fe_2O_3$ | 96 | $K_2O$ | 2 | $Al_2O_3$ | 2 | | |

Where the active catalytic material is supported, the support can be magnesia, zinc oxide, beryllium oxide, zirconium oxide, etc. Among the supported catalysts deriving their activity from the oxides of metals of atomic number from 26 to 29, inclusive, which can be employed in accordance with this invention, are those composed of the following amounts of the following materials by weight:

ably the ether will be continuously fed to a fixed bed of the catalyst. The weight hourly space velocity can be in the range from about 0.1 to 5. The monoolefin hydrocarbons can be separated from the reactor effluent and recycled in admixture with recovered and fresh tertiary-alkyl ether. This recycle can also be performed at a weight hourly space velocity within the range of about 0.1 to 5, expressed in terms of weight units of tertiary

TABLE II

| Catalyst | Component | Parts | Component | Parts | Component | Parts | Component | Parts |
|---|---|---|---|---|---|---|---|---|
| VI | MgO | 80 | $Fe_2O_3$ | 20 | CuO | 5 | | |
| VII | MgO | 80 | $Fe_2O_3$ | 20 | CuO | 5 | $K_2O$ | 1.5 |
| VIII | MgO | 80 | $Fe_2O_3$ | 20 | CuO | 5 | $Na_2$ | 1.5 |
| IX | MgO | 80 | $Cr_2O_3$ | 20 | CuO | 5 | $K_2O$ | 1.5 |
| X | MgO | 80 | $MnO_2$ | 20 | CuO | 5 | $K_2O$ | 1.5 |
| XI | MgO | 90 | $Co_2O_3$ | 10 | CuO | 5 | $K_2O$ | 1.5 |
| XII | ZnO | 80 | $Fe_2O_3$ | 20 | CuO | 5 | $K_2O$ | 5 |
| XIII | $ZrO_2$ | 80 | $Fe_2O_3$ | 20 | CuO | 5 | $K_2O$ | 5 |
| XIV | BeO | 80 | $Fe_2O_3$ | 20 | CuO | 5 | $K_2O$ | 5 |
| XV | MgO | 85 | CuO | 10 | $K_2O_5$ | 5 | | |

The "Dow B" catalyst used in the following examples is a calcium-nickel phosphate catalyst of the approximate formula $Ca_8Ni(PO_4)_6$ stabilized with chromium oxide. It is prepared by precipitating a solution of nickel and calcium chlorides with an ammonia-phosphoric acid solution. The flocculent precipitate is washed, filtered, dried, ground, mixed with 2 percent by weight of chroether plus the weight units of monoolefin per weight unit of catalyst per hour.

The relative amounts of inert gas to tertiary ether (plus monoolefin hydrocarbon if any is recycled or otherwise present) will ordinarily be within the molar range of about 3 to 50:1, with ratios in the range of about 10 to 20:1 usually preferred.

The following examples of the process of this invention are intended to be illustrative only and not limiting.

Example I

Tertiaryamylmethyl ether (B.P. 86-87° C.) in admixture with steam was passed through a reactor charged with 200 grams of Shell 205 dehydrogenation catalyst. Before being introduced into the catalyst bed, the tertiaryamylmethyl ether and steam were preheated to a temperature of about 1150° F. and the catalyst bed was maintained at a temperature of 1100 to 1150° F. The space velocity was 0.8 (weight units of tertiaryamylmethyl ether per weight unit of catalyst per hour) and 14.5 moles of steam per mole of tertiaryamylmethyl ether were employed in admixture with the tertiaryamylmethyl ether. This procedure was conducted for a period of 50 minutes. Analysis of the non-aqueous effluent upon completion of the experiment showed the following weight percent distribution of products.

| | Percent |
|---|---|
| Unconverted tertiaryamylmethyl ether | 18 |
| Isoamylenes (3-methyl-1-butene, 2-methyl-2-butene and 2-methyl-1-butene) | 61 |
| Isoprene | 17 |
| $C_4$ and lighter hydrocarbons | 4 |

Analysis of the aqueous reactor effluent showed the presence of 4.5 percent methanol.

Example II

Tertiaryamylmethyl ether (B.P. 86-87° C.) in admixture with steam was passed through a reactor charged with 108 gms. of Dow B dehydrogenation catalyst. Before being introduced into the catalyst bed, the mixture of tertiaryamylmethyl ether and steam was preheated to a temperature of about 1060° F. The catalyst bed was maintained at a temperature of about 1060 to 1070° F. The space velocity was 0.8 (weight units of tertiaryamylmethyl ether per weight unit of catalyst per hour) and 15.7 moles of steam per mole of tertiaryamylmethyl ether were employed in admixture with the tertiaryamylmethyl ether. This procedure was conducted for a period of 15 minutes. Analysis of the non-aqueous reactor effluent upon completion of the experiment showed the following weight percent distribution of products.

| | Percent |
|---|---|
| Unconverted tertiaryamylmethyl ether | 1 |
| Isoprene | 10 |
| Isoamylenes | 87 |
| $C_4$ and lighter hydrocarbons | 2 |

Analysis of the aqueous reactor effluent showed the pressure of 4 percent by weight of methanol.

We claim:

1. A method for making a conjugated diene which comprises contacting an alkoxy alkane in which the alkoxy group is attached to a tertiary carbon of an alkyl group of 5 to about 12 carbon atoms, in the vapor phase with a dehydrogenating catalyst at a temperature of about 1000° F. to 1250° F. while the ether is in admixture with about 3 to 50 moles of an inert gas per mole of ether.

2. The process of claim 1 where the temperature is about 1100° to 1200° F.

3. The process of claim 1 where the inert gas is steam.

4. The process of claim 3 where the steam is present in an amount of about 10 to 20 moles per mole of ether.

5. The process of claim 3 where the ether is tertiaryamylmethyl ether.

6. The process of claim 3 where the catalyst is a calcium-nickel phosphate of the approximate formula $Ca_8Ni(PO_4)_6$.

7. The process of claim 3 where the catalyst consists essentially of a predominant amount of iron oxide and minor proportions of potassium oxide and chromium oxide.

References Cited in the file of this patent

UNITED STATES PATENTS

| 2,075,100 | Dreyfus | Mar. 30, 1937 |
| 2,442,320 | Britton et al. | May 25, 1948 |
| 2,853,535 | Friedman et al. | Sept. 23, 1958 |

OTHER REFERENCES

Marx: Chemical Abstracts, vol. 28, 1934, columns 2322-3.